(12) United States Patent
Spiegelberg et al.

(10) Patent No.: US 11,192,416 B2
(45) Date of Patent: Dec. 7, 2021

(54) ADJUSTING DEVICE FOR A CHASSIS OF A MOTOR VEHICLE AND REAR-AXLE STEERING SYSTEM

(71) Applicant: ZF Friedrichshafen AG, Friedrichshafen (DE)

(72) Inventors: Jochen Spiegelberg, Bissendorf (DE); Marc Maroncelli, Friedrichshafen (DE); Sören Bökelheide, Bad Oeynhausen (DE); Carina Nieberding, Holdorf (DE); Mark Rotary, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/626,626

(22) PCT Filed: Jun. 20, 2018

(86) PCT No.: PCT/EP2018/066334
§ 371 (c)(1),
(2) Date: Dec. 26, 2019

(87) PCT Pub. No.: WO2019/007683
PCT Pub. Date: Jan. 10, 2019

(65) Prior Publication Data
US 2020/0156426 A1    May 21, 2020

(30) Foreign Application Priority Data

Jul. 7, 2017 (DE) .................... 10 2017 211 672.2

(51) Int. Cl.
*B62D 5/04* (2006.01)
*B60G 7/00* (2006.01)
(Continued)

(52) U.S. Cl.
CPC .......... *B60G 7/006* (2013.01); *B62D 5/0442* (2013.01); *B62D 7/146* (2013.01); *B62D 7/16* (2013.01);
(Continued)

(58) Field of Classification Search
CPC ...... B62D 5/0442; B62D 5/0424; B62D 7/16; B62D 7/1545; B62D 5/0445;
(Continued)

(56) References Cited

U.S. PATENT DOCUMENTS 6,851,508 B2 * 2/2005 Fukuda ................ B62D 5/0427
180/443
7,044,263 B2 * 5/2006 Fischbach ............ B62D 5/0424
180/443
8,516,914 B2 8/2013 Osterlänger et al.
2016/0272224 A1 * 9/2016 Beck ......................... B61G 7/10
2019/0092378 A1 * 3/2019 Klank ...................... B62D 3/06

FOREIGN PATENT DOCUMENTS

DE    10 2005 042 821 A1    3/2007
DE    10 2007 050 794 A1    4/2009
(Continued)

OTHER PUBLICATIONS

German Office Action Corresponding to 10 2017 211 672.2 dated May 23, 2018.
(Continued)

*Primary Examiner* — Paul N Dickson
*Assistant Examiner* — Matthew D Lee
(74) *Attorney, Agent, or Firm* — Finch & Maloney, PLLC; Michael J. Bujold; Jay S. Franklin

(57) ABSTRACT

An adjustment device (1) for a chassis of a motor vehicle. The adjustment device has an actuator (2) with a housing (5) and a spindle drive, which has an axially displaceable spindle (10), with a fixed mounting (7) on the vehicle side and a connecting element (4) on the chassis side. The spindle (10) is extended in a direction of its longitudinal axis by an
(Continued)

extension piece (11), and the connecting element (4) is attached to the outer end (11b) of the extension piece (11).

9 Claims, 2 Drawing Sheets

(51) Int. Cl.
*B62D 7/14* (2006.01)
*B62D 7/16* (2006.01)

(52) U.S. Cl.
CPC ...... *B60G 2202/42* (2013.01); *B60G 2202/44* (2013.01); *B60G 2204/143* (2013.01); *B60G 2204/148* (2013.01); *B60G 2204/41* (2013.01); *B60G 2204/418* (2013.01)

(58) Field of Classification Search
CPC .. B62D 5/0451; B62D 7/146; B60G 2202/42; B60G 2202/44; B60G 7/006; B60G 2204/143; B60G 2204/148; B60G 2204/41; B60G 2204/418
See application file for complete search history.

(56) References Cited

FOREIGN PATENT DOCUMENTS

| | | | |
|---|---|---|---|
| DE | 10 2008 021 861 A1 | 11/2009 | |
| DE | 10 2015 206 455 A1 | 9/2016 | |
| DE | 10 2015 219 198 A1 | 4/2017 | |
| DE | 10 2015 224 775 A1 | 6/2017 | |
| DE | 102017209685 A1 * | 12/2018 | ............. B62D 7/146 |
| DE | 102018206551 A1 * | 10/2019 | ........... B62D 5/0424 |
| EP | 2 452 842 A1 | 5/2012 | |
| KR | 20080002917 A * | 1/2008 | ............... B62D 7/20 |
| KR | 10 2008 0112463 A | 12/2008 | |
| WO | WO-2006070889 A1 * | 7/2006 | ........... B62D 5/0448 |

OTHER PUBLICATIONS

International Search Report Corresponding to PCT/EP2018/066334 dated Oct. 9, 2018.
Written Opinion Corresponding to PCT/EP2018/066334 dated Oct. 9, 2018.

* cited by examiner

ADJUSTING DEVICE FOR A CHASSIS OF A MOTOR VEHICLE AND REAR-AXLE STEERING SYSTEM

This application is a National Stage completion of PCT/EP2018/066334 filed Jun. 20, 2018, which claims priority from German patent application serial no. 10 2017 211 672.2 filed Jul. 7, 2017.

FIELD OF THE INVENTION

The invention relates to an adjustment device for a chassis of a motor vehicle and to a rear axle steering system.

BACKGROUND OF THE INVENTION

From DE 10 2008 021 861 A1 an actuator for a chassis of a motor vehicle has become known, wherein the actuator comprises a spindle drive that can be driven by an electric motor, and has an axially displaceable spindle which is articulated at its outer end to a movable chassis component, in particular a control arm. The actuator has a housing supported on the chassis by a mounting. When the actuator is activated by the electric motor, the spindle is moved in its longitudinal direction and in that way adjusts the chassis control arm.

For the rear axle steering system of a motor vehicle it is known to fit either two separate actuators, i.e. one actuator for each rear wheel, or only one centrally arranged actuator which acts upon both of the rear wheels. Depending on the purpose intended, such actuators are available in various sizes. A problem can then arise if the available actuators, also called adjusters for short, cannot be used owing to special installation conditions in the vehicle. A new design adapted to the special installation conditions in the vehicle is as a rule too costly.

SUMMARY OF THE INVENTION

A purpose of the present invention is to adapt an existing actuator to the special installation conditions in the vehicle.

The invention embodies the characteristics specified in the independent claim(s). Advantageous design features emerge from the subordinate claims.

According to the invention, it is provided that the spindle of the actuator is extended in the axial direction by an extension piece, wherein at the outer end of the extension piece is arranged a connecting element on the chassis side, for example a joint fork, for connection to a wheel carrier in order to steer a wheel. The extension of the spindle brings the advantage that a commercially available or mass-produced existing actuator can be adapted to the predetermined distance between the support point on the vehicle side and the articulation point on the chassis side. Thus, no new design of the actuator for the special fitting conditions is needed, so that costs are saved. The extension of the spindle, particularly by an extension piece, can be retrofitted in a simple way. The extension piece is a separate component which can be connected with interlock or by friction force to the spindle, preferably to the end thereof, for example by screwing.

According to an alternative design, the extension piece is made integrally with the spindle, i.e. the spindle itself is extended. In this case it is only necessary to replace the existing spindle with a new, adapted spindle of the required length. Thus, according to the length required an inexpensive adaptation of a existing actuator is enabled very easily.

In a preferred embodiment the extension piece is designed to be supported on the vehicle side and in particular on the chassis side or supported on the chassis. Owing to the connection of the extension piece to a chassis control arm or wheel carrier, transverse forces and bending torques occur which can result in increased loading of the extension piece or to buckling thereof. These forces and torques are absorbed by the support on the vehicle. In other words, the support is provided by the vehicle body or by auxiliary components attached to the vehicle's structure or body. For this, a guiding element can be provided in the area of the extension piece, which surrounds the extension piece. The guiding element can be supported on the vehicle, for example on the vehicle body or on the chassis, for example on the subframe, the axle carrier, the auxiliary frame (or other vehicle or chassis components).

According to a further preferred embodiment the extension piece is supported by a slide or thrust bearing. The extension piece, which is preferably of cylindrical form, is guided by the slide or thrust bearing and supported therein in the radial direction, i.e. transversely to its longitudinal axis. Alternatively to a cylindrical design, however, the extension piece can have a polygonal peripheral shape. In such a case the inner contour of the slide or thrust bearing is also made polygonal so that the extension piece can slide in the bearing without rotating.

In a further preferred embodiment the slide or thrust bearing is arranged inside a bearing block, which for its part is attached to the vehicle, in particular to the vehicle's body or to an auxiliary frame. In order that the extension piece and therefore also the spindle will be guided over a sufficiently long section, it is preferable for two slide bearings to be provided, one at each end of the bearing block. This effectively prevents any buckling of the extension piece due to the high forces that occur when guiding a wheel.

According to a further preferred embodiment the extension piece is connected to the spindle in a detachable or non-detachable manner, preferably by threaded means provided at its end, namely in such manner that the extension piece has a threaded pin at its end that can be screwed into a threaded bore at the end of the spindle. It is also possible to press-fit or to weld the two components to one another. This brings the advantage that the extension piece can be retrofitted to an existing actuator in a simple way. Furthermore, the spindle extended in that manner is suitable for the high forces that occur when guiding a wheel.

In a further preferred embodiment the slide or thrust bearing can be made integrally with the housing of the actuator, and the housing can be supported on the vehicle in the area of the extension piece so that the forces and torques acting from the chassis control arm on the extension piece are absorbed and buckling is avoided.

According to another preferred embodiment, the chassis comprises a track control arm or a wheel carrier which is articulated to the connecting element of the actuator. In that way the actuator can be used for a rear axle steering system of a vehicle.

The adjustment device itself is understood to be a wheel-guiding component designed like a two-point control arm whose length, however, can be adjusted. Thanks to the adjustability of the length, by supporting one end of the adjustment device on the vehicle body, steering movement can be produced on a wheel carrier or track control arm when the other end is connected to those components. Such an adjustment device can also be used in order, instead of the tracking, to vary the camber of a wheel relative to the vehicle body or the chassis.

The invention also relates to a steer-by-wire steering system, in particular a rear axle steering system with an adjustment device according to the above-described versions. Steer-by-wire steering systems are not mechanically coupled to a steering-wheel. They are controlled by control signals as a function of parameters such as the steering angle at the wheels of the vehicle's axles and the steering-wheel, the speed and acceleration of the vehicle, etc.

BRIEF DESCRIPTION OF THE DRAWINGS

An example embodiment of the invention is illustrated in the drawings and will be described in greater detail below, so that from the description and/or the drawings further features and/or advantages can emerge. The drawings show.

DETAILED DESCRIPTION OF THE PREFERRED EMBODIMENTS

Figure 1:
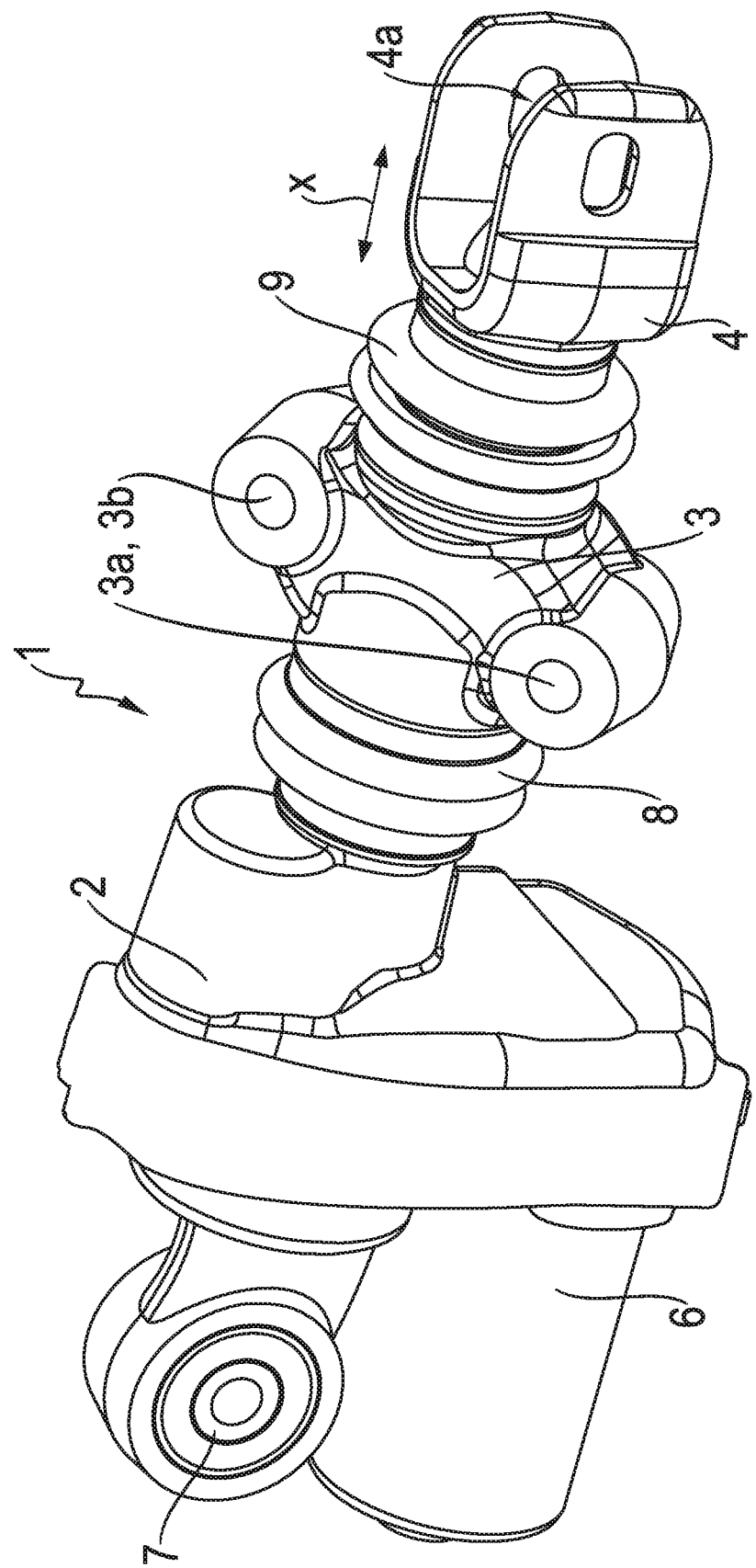
FIG. 1: A perspective representation of an adjustment device with an actuator and a bearing block.

FIG. 1 shows a perspective representation of an adjustment device 1, which comprises an actuator 2, a bearing block 3 and a connecting element 4 in the form of a fork 4 with apertures 4a. The actuator 2 has a housing 5 in which a spindle drive (not shown) is accommodated, this being able to be driven by an electric motor 6. The adjustment device 1 serves to adjust a movable chassis component (not shown), preferably a track control arm of a rear axle of a vehicle, and is supported by means of a mounting 7 in the form of a rubber mounting 7 on the vehicle, in particular on an auxiliary frame (not shown). The bearing block 3 has two fixing eyes 3a, 3b by means of which it is supported on the vehicle. The fork 4, by means of which the apertures 4a of the track control arm (not shown) is articulated, can be adjusted in the longitudinal direction of the spindle, represented by a double arrow X. Between the actuator housing 5 and the bearing block 3 is arranged a first bellows 8 and between the bearing block 3 and the fork 4 is arranged a second bellows 9.

Figure 2:
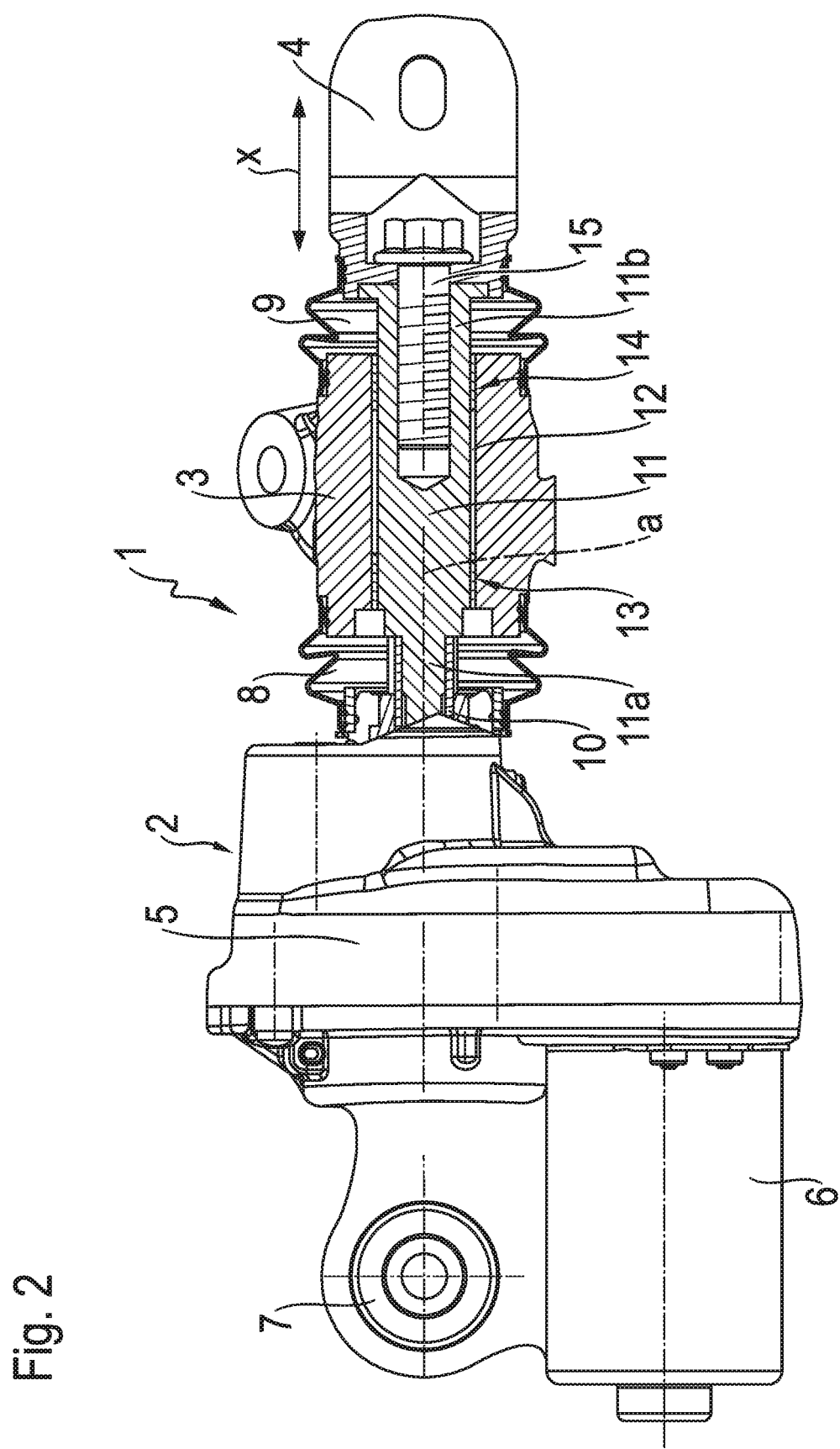
FIG. 2: The adjustment device, partially as viewed and partially sectioned in the area of the bearing block.

FIG. 2 shows another representation of the adjustment device 1, with the actuator 2 and its electric motor 6 and the rubber mounting 7 viewed from the side and the bearing block 3 shown in section. The—only partly visible—spindle 10 of the spindle drive of the actuator 2 has a longitudinal or spindle axis a and is extended in the direction of the spindle axis a by an extension piece 11. The extension piece 11, which is preferably of circular-cylindrical shape, has a threaded pin 11a which at the end is screwed into the spindle 10 so that between the spindle 10 and the extension piece 11 there is formed a firm but releasable connection. Non-releasable connections such as press-fit or welded connections are also possible, but not shown. The bearing block 3, which is fixed to the vehicle, has a through-bore 12 into which the extension piece 11 extends. In the through-bore 12 there are at its respective ends a first slide bearing 13 and a second slide bearing 14, by which the extension piece 11 is guided as it slides in the bearing block 3. At its outer end facing away from the actuator 2, the extension piece 11 is firmly connected to the connecting element 4 in the form of a fork 4 by a screw-bolt 15 which is screwed into a threaded bore 16 in the extension piece 11. Thus, the fork 4 can be adjusted by the spindle 10 in the adjustment direction X by way of the extension piece 11. The extension piece 11, the part of the spindle 10 projecting out of the housing 5 and the two slide bearings 13, 14 are sealed against dirt coming in from the outside by the first bellows 8 and the second bellows 9. Thanks to the use of the extension piece 11 in combination with the bearing block 3 the distance between the mounting point 7 fixed on the vehicle and the connection point 4 on the chassis side is increased. Forces and torques transferred from the moving chassis component to the fork 4 and from there to the extension piece 11, are supported via the bearing block 3 on the vehicle, so that no unacceptable loading of the extension piece 11 and its connection to the spindle 10 takes place.

The scope of the invention also includes alternative embodiments not shown in the drawing, in which the spindle is made integrally with the extension piece and/or the bearing block is made integrally with the actuator housing.

INDEXES

1 Adjustment device
2 Actuator
3 Bearing block
3a Fixing eye
3b Fixing eye
4 Connecting element/Fork
4a Aperture
5 Housing
6 Electric motor
7 Rubber mounting
8 First bellows
9 Second bellows
10 Spindle
11 Extension piece
11a Threaded pin
11b Outer end
12 Through-bore
13 First slide bearing
14 Second slide bearing
15 Screw-bolt
16 Threaded bore
a Longitudinal axis of the spindle
X Adjustment direction

The invention claimed is:

1. An adjustment device, for a chassis of a motor vehicle, comprising:
an actuator having a housing and a spindle drive with an axially displaceable spindle, and the spindle defining a spindle axis,
a fixed mounting being fixed to the vehicle on a vehicle side of the adjustment device, and a connection element being coupled to a moveable chassis component on a chassis side of the adjustment device,
the spindle being extended, in an axial direction, by an extension piece which is coupled to an axial end of the spindle, and the extension piece extends outside the housing and is supported outside the housing by a guiding element of the actuator, the guiding element being spaced away from the housing and connected to a vehicle structure or body such that loads transferred from the moving chassis component to the connection element and from the connection element to the extension piece are supported on the vehicle structure or body via the guiding element to prevent increased loading or buckling of the extension piece, and
the connection element being attached to an outer end of the extension piece.

2. The adjustment device according to claim 1, wherein the axial end of the spindle has a bore and the extension piece has a pin end which is received within the bore in the axial end of the spindle.

3. The adjustment device according to claim 2, wherein a bellows surrounds the pin end of the extension piece, a first axial end of the bellows being connected to the housing and a second axially opposite end of the bellows being connected to the guiding element.

4. The adjustment device according to claim 1, wherein the extension piece is supported by either a slide bearing or a thrust bearing.

5. The adjustment device according to claim 4, wherein the slide bearing or the thrust bearing is supported within the guiding element which is in a form of a bearing block that is fixable to the vehicle structure or body, and the bearing block being separated from the housing of the actuator by a gap.

6. The adjustment device according to claim 4, wherein the guiding element has an axially extending through-bore, a first slide bearing is arranged in one axial end of the through-bore and a second slide bearing is arranged in an axially opposite end of the through-bore, such that the extension piece is axially slidable relative to the guiding element.

7. The adjustment device according to claim 1, wherein the extension piece is either detachably or non-detachably connected to the spindle.

8. A rear axle steering system with an adjustment device for a chassis of a motor vehicle, the adjustment device comprising:
    an actuator having a housing and a spindle drive with an axially displaceable spindle,
    a fixed mounting being fixed to the vehicle on a vehicle side of the adjustment device, and a connection element being coupled to a moveable chassis component on a chassis side of the adjustment device,
    the spindle being extended, in an axial direction, by an extension piece which is coupled to an axial end of the spindle, and the extension piece extends outside the housing and is supported outside the housing by a guiding element of the actuator, the guiding element being axially spaced from the housing by a gap, and the guiding element being connected to a vehicle structure or body such that loads transferred from the moving chassis component to the connection element and from the connection element to the extension piece are supported on the vehicle structure or body via the guiding element to prevent increased loading or buckling of the extension piece, and
    the connection element being attached to an outer end of the extension piece.

9. An adjustment device, for a chassis of a motor vehicle, the adjustment device comprising:
    an actuator being accommodated within a housing and having a spindle drive with a spindle that extends outside the housing along a spindle axis, the spindle having an axial end, the spindle being axially displaceable along the spindle axis, and the housing having a fixing mount,
    an extension piece having axially opposite first and second ends, the first end being connected to the axial end of the spindle and the extension piece extending along the spindle axis away from the actuator, the extension piece being slidably supported by a bearing block having at least one fixing eye, the bearing block being separated from the housing and having a through-bore that extends from a first axial side of the bearing block to an opposite second axial side of the bearing block,
    a connection element being attached to the second end of the extension piece that is remote from the actuator, and the connection element having at least one aperture,
    a first bellows being connected to the housing and the first axial side of the bearing block to enclose the first end of the extension piece, and a second bellows being connected to the second axial side of the bearing block and the connection element to enclose the second end of the extension piece, and
    the adjustment device being supported on a vehicle via the fixing mount of the housing and the at least one fixing eye of the bearing block, and the connection element being connected to a movable chassis component.

* * * * *